United States Patent
Määttänen et al.

(10) Patent No.: US 12,250,175 B2
(45) Date of Patent: Mar. 11, 2025

(54) INDICATION OF SPATIAL RELATION FOR PUCCH

(71) Applicant: Telefonaktiebolaget LM Ericsson (publ), Stockholm (SE)

(72) Inventors: Helka-Liina Määttänen, Helsinki (FI); Mats Folke, Vällingby (SE); Siva Muruganathan, Stittsville (CA)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 329 days.

(21) Appl. No.: 17/774,987

(22) PCT Filed: Sep. 22, 2020

(86) PCT No.: PCT/SE2020/050882
§ 371 (c)(1),
(2) Date: May 6, 2022

(87) PCT Pub. No.: WO2021/091445
PCT Pub. Date: May 14, 2021

(65) Prior Publication Data
US 2022/0393840 A1 Dec. 8, 2022

Related U.S. Application Data

(60) Provisional application No. 62/932,050, filed on Nov. 7, 2019, provisional application No. 62/932,108, filed on Nov. 7, 2019.

(51) Int. Cl.
*H04L 5/00* (2006.01)
*H04W 72/231* (2023.01)

(52) U.S. Cl.
CPC ......... *H04L 5/0053* (2013.01); *H04W 72/231* (2023.01); *H04L 5/0092* (2013.01)

(58) Field of Classification Search
CPC .... H04L 5/0053; H04W 72/23; H04W 72/231
See application file for complete search history.

(56) References Cited

U.S. PATENT DOCUMENTS

| 2020/0007294 | A1* | 1/2020 | Yang | H04L 5/0055 |
| 2021/0377747 | A1* | 12/2021 | Miao | H04W 16/28 |
| 2022/0209916 | A1* | 6/2022 | Krishnamoorthy | H04L 27/261 |

OTHER PUBLICATIONS

International Search Report and Written Opinion of the International Searching Authority, PCT/SE2020/050882, mailed Dec. 19, 2020, 11 pages.

(Continued)

*Primary Examiner* — Kevin C. Harper
(74) *Attorney, Agent, or Firm* — Weisberg I.P. Law, P.A.

(57) ABSTRACT

In one aspect, a method performed by a wireless device for obtaining information about Physical Uplink Control Channel (PUCCH) resources is provided. The method includes receiving a Medium Access Control (MAC) Control Element (CE) from a network, wherein the MAC CE contains respective spatial relation information relating to PUCCH resources configured for at least one specific bandwidth part. In a further aspect, a wireless device for obtaining information about PUCCH resources is provided. The wireless device includes power supply circuitry configured to supply power to the wireless device and processing circuitry configured to cause the wireless device to receive a MAC CE from a network, wherein the MAC CE contains respective spatial relation information relating to PUCCH resources configured for at least one specific bandwidth part.

13 Claims, 17 Drawing Sheets

| C(2) | R | Serving cell ID (5) |
|---|---|---|
| PUCCH-SpatialRelationInfo BWP₁ (6) | | PUCCH-SpatialRelationInfo BWP₂ (2 bits out of 6) |
| PUCCH-SpatialRelationInfo BWP₂ (4 bits out of 6) | | PUCCH-SpatialRelationInfo BWP₃ (4 bits out of 6) |
| PUCCH-SpatialRelationInfo BWP₃ (2 bits out of 6) | | PUCCH-SpatialRelationInfo BWP₄ (6) |
| C(2) | R | Serving cell ID (5) |
| PUCCH-SpatialRelationInfo BWP₁ (6) | | PUCCH-SpatialRelationInfo BWP₂ (2 bits out of 6) |
| PUCCH-SpatialRelationInfo BWP₂ (4 bits out of 6) | | PUCCH-SpatialRelationInfo BWP₃ (4 bits out of 6) |
| PUCCH-SpatialRelationInfo BWP₃ (2 bits out of 6) | | PUCCH-SpatialRelationInfo BWP₄ (6) |

(56) References Cited

OTHER PUBLICATIONS

"Remaining issues on multi-beam enhancements," 3GPP TSG-RAN WG1 Meeting #98bis, Chongqing, China, Oct. 14-20, 2019, Tdoc R1-1911224, Agenda Item 7.2.8.3, Ericsson (XP051808346) 14 pages.
"Details of latency and overhead reduction for beam management," 3GPP TSG RAN WG1 #97, Reno, USA, May 13-17, 2019, R1-1906245, Agenda Item 7.2.8.5, ZTE (XP051727698) 5 pages.

* cited by examiner

| E | ServCellIndex | BWP ID | | | | |
|---|---|---|---|---|---|---|
| | | PUCCH-SpatialRelationInfo set₂ | | | | |
| | PUCCH-SpatialRelationInfo set₁ | PUCCH-SpatialRelationInfo set₃ | | | | |
| | | PUCCH-SpatialRelationInfo set₂ | PUCCH-SpatialRelationInfo set₄ | | | |
| | | PUCCH-SpatialRelation-Info set₃ | | | | |
| F | | | PUCCH-Resource ID | | | |
| M | | | | PUCCH-SpatialRelationInfo res | | |
| R | | | | | | |

Fig. 2

| E | Serving cell ID (5) | BWP ID (2) |
|---|---|---|
| | PUCCH-SpatialRelationInfo for a set1 (6) | PUCCH-SpatialRelationInfo for a set2 (2 bits out of 6) |
| | PUCCH-SpatialRelationInfo for a set2 (4 bits out of 6) | PUCCH-SpatialRelationInfo for a set3 (4 bits out of 6) |
| | PUCCH-SpatialRelationInfo for a set3 (2 bits out of 6) | PUCCH-SpatialRelationInfo for a set4 (6) |
| F | PUCCH Resource ID (7) | |
| F | PUCCH Resource ID (7) | |
| F | PUCCH Resource ID (7) | |
| F | PUCCH Resource ID (7) | |
| M | R | PUCCH-SpatialRelationInfo for a group of PUCCH resources (6) |
| F | PUCCH Resource ID (7) | |
| F | PUCCH Resource ID (7) | |
| M | R | PUCCH-SpatialRelationInfo for a group of PUCCH resources (6) |
| F | PUCCH Resource ID (7) | |
| M | R | PUCCH-SpatialRelationInfo for a group of PUCCH resources (6) |

Fig. 3

| E | Serving cell ID (5) | BWP ID (2) |
|---|---|---|
| PUCCH-SpatialRelationInfo for a set1 (6) | | PUCCH-SpatialRelationInfo for a set2 (2 bits out of 6) |
| PUCCH-SpatialRelationInfo for a set2 (4 bits out of 6) | | PUCCH-SpatialRelationInfo for a set3 (4 bits out of 6) |
| PUCCH-SpatialRelationInfo for a set3 (2 bits out of 6) | | PUCCH-SpatialRelationInfo for a set4 (6) |
| PUCCH Group ID (2 bits) | PUCCH-SpatialRelationInfo for a group of PUCCH resources (6) | |
| PUCCH Group ID (2 bits) | PUCCH-SpatialRelationInfo for a group of PUCCH resources (6) | |

Fig. 4

| C(2) | R | Serving cell ID (5) | PUCCH-SpatialRelationInfo BWP$_2$ (2 bits out of 6) | PUCCH-SpatialRelationInfo BWP$_3$ (4 bits out of 6) | PUCCH-SpatialRelationInfo BWP$_4$ (6) | C(2) | R | Serving cell ID (5) | PUCCH-SpatialRelationInfo BWP$_2$ (2 bits out of 6) | PUCCH-SpatialRelationInfo BWP$_3$ (4 bits out of 6) | PUCCH-SpatialRelationInfo BWP$_4$ (6) |
|---|---|---|---|---|---|---|---|---|---|---|---|
| PUCCH-SpatialRelationInfo BWP$_1$ (6) | | | PUCCH-SpatialRelationInfo BWP$_2$ (4 bits out of 6) | PUCCH-SpatialRelationInfo BWP$_3$ (2 bits out of 6) | | PUCCH-SpatialRelationInfo BWP$_1$ (6) | | | PUCCH-SpatialRelationInfo BWP$_2$ (4 bits out of 6) | PUCCH-SpatialRelationInfo BWP$_3$ (2 bits out of 6) | |

Fig. 5

| C(3) | Serving cell ID (5) | PUCCH-SpatialRelationInfo BWP₂ (2 bits out of 6) |
| PUCCH-SpatialRelationInfo BWP₁ (6) | | |
| PUCCH-SpatialRelationInfo BWP₂ (4 bits out of 6) | PUCCH-SpatialRelationInfo BWP₃ (4 bits out of 6) | |
| PUCCH-SpatialRelationInfo BWP₃ (2 bits out of 6) | PUCCH-SpatialRelationInfo BWP₄ (6) | |
| R | Serving cell ID (5) | PUCCH-SpatialRelationInfo BWP₂ (2 bits out of 6) |
| PUCCH-SpatialRelationInfo BWP₁ (6) | | |
| PUCCH-SpatialRelationInfo BWP₂ (4 bits out of 6) | PUCCH-SpatialRelationInfo BWP₃ (4 bits out of 6) | |
| PUCCH-SpatialRelationInfo BWP₃ (2 bits out of 6) | PUCCH-SpatialRelationInfo BWP₄ (6) | |

Fig. 6

Receive a MAC CE from a network, wherein the MAC CE contains respective spatial relation information relating to PUCCH resources configured for at least one specific bandwidth part — 1800

Fig. 18

Virtual Apparatus — 1900

Receiving Unit — 1902

Fig. 19

INDICATION OF SPATIAL RELATION FOR PUCCH

CROSS REFERENCE TO RELATED APPLICATIONS

This application is a 35 U.S.C. § 371 national stage application of PCT International Application No. PCT/SE2020/050882 filed on Sep. 22, 2020, which in turn claims domestic priority to U.S. Provisional Patent Application No. 62/932,050, filed on Nov. 7, 2019 and U.S. Provisional Patent Application No. 62/932,108, filed on Nov. 7, 2019, the disclosures and content of which are incorporated by reference herein in their entirety.

TECHNICAL FIELD

Embodiments of the present disclosure relate to wireless networks and particularly to methods, apparatus and machine-readable media for indicating spatial relationships in wireless networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Spatial Relations and QCL

Several signals can be transmitted from the same base station antenna from different antenna ports. These signals can have the same large-scale properties, for instance in terms of Doppler shift/spread, average delay spread, or average delay, when measured at the receiver. These antenna ports are then said to be quasi co-located (QCL).

The network can then signal to the User Equipment, UE, that two antenna ports are QCL. If the UE knows that two antenna ports are QCL with respect to a certain parameter (e.g. Doppler spread), the UE can estimate that parameter based on a reference signal transmitted one of the antenna ports and use that estimate when receiving another reference signal or physical channel the other antenna port. Typically, the first antenna port is represented by a measurement reference signal such as Channel State Information Reference Signal, CSI-RS, (known as source reference signal, RS) and the second antenna port is a demodulation reference signal (DMRS) (known as target RS) for Physical Downlink Shared Channel (PDSCH) or Physical Downlink Control Channel (PDCCH) reception.

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In New Radio (NR), four types of QCL relations between a transmitted source RS and transmitted target RS were defined:
Type A: {Doppler shift, Doppler spread, average delay, delay spread}
Type B: {Doppler shift, Doppler spread}
Type C: {average delay, Doppler shift}
Type D: {Spatial Receive, Rx, parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it is also necessary to convey a Type A QCL relation for the RSs to the UE, so that it can estimate all the relevant large-scale parameters.

Spatial QCL Definition

In NR, the term "spatial quasi-location (QCL)" has been adopted and applies to a relationship between the antenna port(s) of two different downlink (DL) reference signals (RSs). If two transmitted DL RSs are spatially QCL'd at the UE receiver, then the UE may assume that the first and second RSs are transmitted with approximately the same Transmitter, Tx, spatial filter configuration. Thus, the UE may use approximately the same Rx spatial filter configuration to receive the second reference signal as it used to receive the first reference signal. In this way, spatial QCL is a term that assists in the use of analog beamforming and formalizes the notion of "same UE Rx beam" over different time instances.

Spatial Relation Definition

While spatial QCL refers to a relationship between two different DL RSs from a UE perspective, NR has also adopted the term "spatial relation" to refer to a relationship between a uplink, UL, RS (Physical Uplink Control Channel, PUCCH/Physical Uplink Shared Channel, PUSCH, Demodulation reference signal, DMRS) and another RS, which can be either a DL RS (CSI-RS or Synchronization Signal Block, SSB) or an UL RS (Sounding Reference Signal, SRS). This is also defined from a UE perspective. If the UL RS is spatially related to a DL RS, it means that the UE should transmit the UL RS in the opposite (reciprocal) direction from which it received the DL RS previously. More precisely, the UE should apply the "same" Tx spatial filtering configuration for the transmission of the first RS as the Rx spatial filtering configuration it used to receive the second RS previously. If the second RS is an uplink RS, then the UE should apply the same Tx spatial filtering configuration for the transmission of the first RS as the Tx spatial filtering configuration it used to transmit the second RS previously.

In this disclosure, we discuss the spatial relation in context of PUCCH.

PUCCH and Spatial Relations

The PUCCH configuration is given by Radio Resource Control, RRC, to the UE for each bandwidth part (BWP) of each serving cell configured for the UE. The PUCCH configuration includes a list of PUCCH resource sets and PUCCH resources. There can be mostly 4 PUCCH resource sets and each set may include up to 32 PUCCH resources. Thus, the total maximum number of PUCCH resources is 128. The PUCCH configuration also includes a list of PUCCH spatial relationInfo's which gives the RS that should be used as spatial reference when transmitting PUCCH.

PUCCH-SpatialRelationInfo

The information element, IF, PUCCH-SpatialRelation-Info is used to configure the spatial setting for PUCCH transmission and the parameters for PUCCH power control, see TS 38.213, [13], clause 9.2.2.

PUCCH-SpatialRelationInfo Information Element

```
-- ASN1START
-- TAG-PUCCH-SPATIALRELATIONINFO-START
PUCCH-SpatialRelationInfo ::=        SEQUENCE {
    pucch-SpatialRelationInfoId        PUCCH-SpatialRelationInfoId,
    servingCellId                      ServCellIndex
OPTIONAL,   -- Need S
    referenceSignal                    CHOICE {
        ssb-Index                          SSB-Index,
        csi-RS-Index                       NZP-CSI-RS-ResourceId,
        srs                                SEQUENCE {
                                               resource
SRS-ResourceId,                                uplinkBWP
BWP-Id                                     }
    },
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
}
PUCCH-SpatialRelationInfoId ::=      INTEGER
(1..maxNrofSpatialRelationInfos)
-- TAG-PUCCH-SPATIALRELATIONINFO-STOP
-- ASN1STOP
```

| PUCCH-SpatialRelationInfo field descriptions |
|---|
| servingCellId<br>If the field is absent, the UE applies the ServCellId of the serving cell in which this PUCCH-SpatialRelationInfo is configured |

PUCCH-Config

The IE PUCCH-Config is used to configure UE specific PUCCH parameters (per BWP).

PUCCH-Config Information Element

```
-- ASN1START
-- TAG-PUCCH-CONFIG-START
PUCCH-Config ::=                     SEQUENCE {
    resourceSetToAddModList              SEQUENCE (SIZE (1..maxNrofPUCCH-
ResourceSets)) OF PUCCH-ResourceSet   OPTIONAL, -- Need N
    resourceSetToReleaseList             SEQUENCE (SIZE (1..maxNrofPUCCH-
ResourceSets)) OF PUCCH-ResourceSetId OPTIONAL, -- Need N
    resourceToAddModList                 SEQUENCE (SIZE (1..maxNrofPUCCH-
Resources)) OF PUCCH-Resource         OPTIONAL, -- Need N
    resourceToReleaseList                SEQUENCE (SIZE (1..maxNrofPUCCH-
Resources)) OF PUCCH-ResourceId       OPTIONAL, -- Need N
    format1                              SetupRelease { PUCCH-
FormatConfig }                           OPTIONAL, -- Need M
    format2                              SetupRelease { PUCCH-
FormatConfig }                           OPTIONAL, -- Need M
    format3                              SetupRelease { PUCCH-
```

```
FormatConfig }                                    OPTIONAL, -- Need M
    format4                              SetupRelease { PUCCH-
FormatConfig }                                    OPTIONAL, -- Need M
    schedulingRequestResourceToAddModList    SEQUENCE (SIZE (1.. maxNrofSR-
Resources)) OF SchedulingRequestResourceConfig
OPTIONAL, -- Need N
    schedulingRequestResourceToReleaseList   SEQUENCE (SIZE (1..maxNrofSR-
Resources)) OF SchedulingRequestResourceId
OPTIONAL, -- Need N
    multi-CSI-PUCCH-ResourceList             SEQUENCE (SIZE (1..2)) OF PUCCH-
ResourceId                                OPTIONAL, -- Need M
    dl-DataToUL-ACK                          SEQUENCE (SIZE (1..8)) OF
INTEGER (0..15)                                   OPTIONAL, -- Need M
    spatialRelationInfoToAddModList          SEQUENCE (SIZE
(1..maxNrofSpatialRelationInfos)) OF PUCCH-SpatialRelationInfo
OPTIONAL, -- Need N
    spatialRelationInfoToReleaseList         SEQUENCE (SIZE
(1..maxNrofSpatialRelationInfos)) OF PUCCH-SpatialRelationInfoId
OPTIONAL, -- Need N
    pucch-PowerControl                       PUCCH-PowerControl
OPTIONAL, -- Need M
    ...
}
PUCCH-FormatConfig ::=                   SEQUENCE {
    interslotFrequencyHopping                ENUMERATED {enabled}
OPTIONAL, -- Need R
    additionalDMRS                           ENUMERATED {true}
OPTIONAL, -- Need R
    maxCodeRate                              PUCCH-MaxCodeRate
OPTIONAL, -- Need R
    nrofslots                                ENUMERATED {n2,n4,n8}
OPTIONAL, -- Need S
    pi2BPSK                                  ENUMERATED {enabled}
OPTIONAL, -- Need R
    simultaneousHARQ-ACK-CSI                 ENUMERATED {true}
OPTIONAL -- Need R
}
PUCCH-MaxCodeRate ::=                    ENUMERATED {zeroDot08, zeroDot15,
zeroDot25, zeroDot35, zeroDot45, zeroDot60, zeroDot80}
-- A set with one or more PUCCH resources
PUCCH-ResourceSet ::=                    SEQUENCE {
    pucch-ResourceSetId                      PUCCH-ResourceSetId,
    resourcelist                             SEQUENCE (SIZE (1..maxNrofPUCCH-
ResourcesPerSet)) OF PUCCH-ResourceId,
    maxPayloadSize                           INTEGER (4..256)
OPTIONAL -- Need R
}
PUCCH-ResourceSetId ::=                  INTEGER (0..maxNrofPUCCH-
ResourceSets-1)
PUCCH-Resource ::=                       SEQUENCE {
    pucch-ResourceId                         PUCCH-ResourceId,
    startingPRB                              PRB-Id,
    intraSlotFrequencyHopping                ENUMERATED { enabled }
OPTIONAL, -- Need R
    secondHopPRB                             PRB-Id
OPTIONAL, -- Need R
    format                                   CHOICE {
        format0                                  PUCCH-format0,
        format1                                  PUCCH-format1,
        format2                                  PUCCH-format2,
        format3                                  PUCCH-format3,
        format4                                  PUCCH-format4
    }
}                                        INTEGER (0..maxNrofPUCCH-Resources-
PUCCH-ResourceId ::=
1)
PUCCH-format0 ::=                            SEQUENCE {
    initialCyclicShift                           INTEGER(0..11) ,
    nrofSymbols                                  INTEGER (1..2),
    startingSymbolIndex                          INTEGER(0..13)
}
PUCCH-format1 ::=                            SEQUENCE {
    initialCyclicShift                           INTEGER(0..11),
    nrofSymbols                                  INTEGER (4..14),
    startingSymbolIndex                          INTEGER(0..10),
    timeDomainOCC                                INTEGER(0..6)
}
PUCCH-format3 ::=                            SEQUENCE {
    nrofPRBs                                     INTEGER (1..16) ,
```

-continued

```
        nrofSymbols                       INTEGER (1..2),
        startingSymbolIndex               INTEGER(0..13)
}
PUCCH-format3 ::=                         SEQUENCE {
        nrofPRBs                          INTEGER (1..16),
        nrofSymbols                       INTEGER (4..14),
        startingSymbolIndex               INTEGER(0..10)
}
PUCCH-format4 ::=                         SEQUENCE {
        nrofSymbols                       INTEGER (4..14),
        occ-Length                        ENUMERATED {n2,n4},
        occ-Index                         ENUMERATED
{n0,n1,n2,n3},
        startingSymbolIndex               INTEGER(0..10)
}
-- TAG-PUCCH-CONFIG-STOP
-- ASN1STOP
```

PUCCH-Config field descriptions dl-DataToUL-ACK
List of timing forgiven PDSCH to the DL ACK (see TS 38.213 [13], clause 9.1.2).
format1
Parameters that are common for all PUCCH resources of format 1.
format2
Parameters that are common for all PUCCH resources of format 2.
format3
Parameters that are common for all PUCCH resources of format 3.
format4.
Parameters that are common for all PUCCH resources of format 4
resourceSetToAddModList, resourceSetToReleaseList
Lists for adding and releasing PUCCH resource sets (see TS 38.213 [13], clause 9.2).
resourceToAddModList, resourceToReleaseList
Lists for adding and releasing PUCCH resources applicable for the UL BWP and serving cell in which the
PUCCH-Config is defined. The resources defined herein are referred to from other parts of the configuration to
determine which resource the UE shall use for which report.
spatialRelationInfoToAddModList
Configuration of the spatial relation between a reference RS and PUCCH. Reference RS can be SSB/CSI-
RS/SRS. If the list has more than one element, MAC-CE selects a single element (see TS 38.321 [3], clause
5.18.8 and TS 38.213 [13], clause 9.2.2).

40

PUCCH-format3 field descriptions nrofPRBs
The supported values are 1, 2, 3, 4, 5, 6, 8, 9, 10, 12, 15 and 16.

PUCCH-FormatConfig field descriptions additionalDMRS
If the field is present, the UE enables 2 DMRS symbols per hop of a PUCCH Format 3 or 4 if both hops are
more than X symbols when FH is enabled (X=4). And it enables 4 DMRS symbols for a PUCCH Format 3 or 4
with more than 2X+1 symbols when FH is disabled (X=4). The field is not applicable for format 1 and 2. See TS
38.213 [13], clause 9.2.2.
interslotFrequencyHopping
If the field is present, the UE enables inter-slot frequency hopping when PUCCH Format 1, 3 or 4 is repeated
over multiple slots. For long PUCCH over multiple slots, the intra and inter slot frequency hopping cannot be
enabled at the same time for a UE. The field is not applicable for format 2. See TS 38.213 [13], clause 9.2.6.
maxCodeRate
Max coding rate to determine how to feedback UCI on PUCCH for format 2, 3 or 4. The field is not applicable
for format 1. See TS 38.213 [13], clause 9.2.5.
nrofSlots
Number of slots with the same PUCCH F1, F3 or F4. When the field is absent the UE applies the value n1. The
field is not applicable for format 2. See TS 38.213 [13], clause 9.2.6.
pi2BPSK
If the field is present, the UE uses pi/2 BPSK for UCI symbols instead of QPSK for PUCCH. The field is not
applicable for format 1 and 2. See TS 38.213 [13], clause 9.2.5.
simultaneousHARQ-A CK-CSI -continued If the field is present, the UE uses simultaneous transmission of CSI and HARQ-ACK feedback with or without SR with PUCCH Format 2, 3 or 4. See TS 38.213 [13], clause 9.2.5. When the field is absent the UE applies the value off. The field is not applicable for format 1.

PUCCH-Resource field descriptions format
Selection of the PUCCH format (format 0-4) and format-specific parameters, see TS 38.213 [13], clause 9.2.
format0 and format1 are only allowed for a resource in a first PUCCH resource set, formats, formats and format4 are only allowed for a resource in non-first PUCCH resource set.
intraSlotFrequencyHopping
Enabling intra-slot frequency hopping, applicable for all types of PUCCH formats. For long PUCCH over multiple slots, the intra and inter slot frequency hopping cannot be enabled at the same time for a UE. See TS 38.213 [13], clause 9.2.1.
pucch-ResourceId
Identifier of the PUCCH resource.
secondHopPRB
Index of first PRB after frequency hopping of PUCCH. This value is applicable for intra-slot frequency hopping (see TS 38.213 [13], clause 9.2.1) or inter-slot frequency hopping (see TS 38.213 [13], clause 9.2.6).

PUCCH-ResourceSet field descriptions maxPayloadSize
Maximum number of UCI information bits that the UE may transmit using this PUCCH resource set (see TS 38.213 [13], clause 9.2.1). In a PUCCH occurrence, the UE chooses the first of its PUCCH-ResourceSetwhich supports the number of bits that the UE wants to transmit. The field is absent in the first set (Set0) and in the last configured set since the UE derives the maximum number of UCI information bits as specified in TS 38.213 [13], clause 9.2.1. This field can take integer values that are multiples of 4.
resourceList
PUCCH resources of format0 and format1 are only allowed in the first PUCCH resource set, i.e., in a PUCCH-ResourceSet with pucch-ResourceSetId = 0. This set may contain between 1 and 32 resources. PUCCH resources of formats, formats and format4 are only allowed in a PUCCH-ResourceSet with pucch-ResourceSetId > 0. If present, these sets contain between 1 and 8 resources each. The UE chooses a PUCCH-Resource from this list as specified in TS 38.213 [13], clause 9.2.3. Note that this list contains only a list of resource IDs. The actual resources are configured in PUCCH-Config.

PUCCH and Spatial Relations Medium Access Control (MAC) Control Element (CE)

The RRC configuration gives lists of PUCCH resources and list of spatial relationsInfo's. In order to map a spatial relation info to a PUCCH resource a MAC CE is used. In Rel-15 the MAC CE is defined as follows:

PUCCH Spatial Relation Activation/Deactivation MAC CE

FIG. 1 shows a PUCCH spatial relation Activation/Deactivation MAC CE. The PUCCH spatial relation Activation/Deactivation MAC CE is identified by a MAC subheader with Logical Channel Identity (LCID) as specified in Table 6.2.1-1 of 3rd Generation Partnership Project (3GPP) TS38.321. It has a fixed size of 24 bits with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

PUCCH Resource ID: This field contains an identifier of the PUCCH resource ID identified by PUCCH-ResourceId as specified in TS 38.331 [5]. The length of the field is 7 bits;

$S_i$: If there is a PUCCH Spatial Relation Info with PUCCH-SpatialRelationInfoId as specified in TS 38.331 [5], configured for the uplink bandwidth part indicated by BWP ID field, $S_i$ indicates the activation status of PUCCH Spatial Relation Info with PUCCH-SpatialRelationInfoId equal to i+1, otherwise MAC entity shall ignore this field. The S field is set to 1 to indicate PUCCH Spatial Relation Info with PUCCH-SpatialRelationInfoId equal to i+1 shall be activated. The $S_i$ field is set to 0 to indicate PUCCH Spatial Relation Info with PUCCH-SpatialRelationInfoId equal to i+1 shall be deactivated. Only a single PUCCH Spatial Relation Info can be active for a PUCCH Resource at a time;

R: Reserved bit, set to 0.

SUMMARY

There currently exist certain challenges.

In Rel-15 a separate MAC CE needs to be given to each PUCCH resource separately and there may be up to 128 PUCCH resources configured for the UE per BWP per serving cell. Thus, the indication of spatial relation for PUCCH is inefficient.

Certain aspects of the present disclosure and their embodiments may provide solutions to these or other challenges.

In one aspect, a method performed by a wireless device for obtaining information about PUCCH resources is provided. The method comprises receiving a Medium Access Control (MAC) Control Element (CE) from a network, in which the MAC CE contains respective spatial relation information relating to PUCCH resources configured for at least one specific bandwidth part.

In another aspect, a wireless device for obtaining information about PUCCH resources is provided. The wireless device comprises power supply circuitry configured to supply power to the wireless device and processing circuitry configured to cause the wireless device to receive a MAC CE from a network, in which the MAC CE contains respective spatial relation information relating to PUCCH resources configured for at least one specific bandwidth part.

In another aspect, a method performed by a base station for providing information about PUCCH resources is provided. The method comprises transmitting a MAC CE to a wireless device, in which the MAC CE contains respective spatial relation information relating to PUCCH resources configured for at least one specific bandwidth part.

In another aspect, a base station for providing information about PUCCH resources is provided. The base station comprising power supply circuitry configured to supply power to the base station and processing circuitry configured to cause the base station to transmit a MAC CE to a wireless device, wherein the MAC CE contains respective spatial relation information relating to PUCCH resources configured for at least one specific bandwidth part.

To efficiently indicate spatial relations for a PUCCH resources in MAC CE, we disclose herein a flexible MAC CE that can indicate more than one spatial relationinfo per PUCCH resource at the time and can flexibly indicate the spatial relationInfo for the following:
- for PUCCH resources in a PUCCH resource set,
- for PUCCH resources in multiple PUCCH resource sets,
- for multiple PUCCH resources,
- for multiple PUCCH resources belonging to a given PUCCH format, or
- for groups of PUCCH resources that contain resources from different PUCCH resource sets
- for all PUCCH resource in cells and BWPs.

This disclosure illustrates a number of solutions and what fields can be included (for example, PUCCH resource set indicator, or PUCCH group, PUCCH format indicator, etc) in the MAC CE.

The MAC CE is sent from the network to the UE.

There are, proposed herein, various embodiments which address one or more of the issues disclosed herein.

Certain embodiments may provide one or more of the following technical advantages.

The disclosed MAC CE for PUCCH resource set activation gives spatial relation information for PUCCH resources in a PUCCH resource set in an efficient and flexible manner due to the format indicators presented here. It also takes into account NR enhanced multiple input multiple output (eMIMO) Release-16 changes affecting MAC CE design.

BRIEF DESCRIPTION OF THE DRAWINGS

FIG. 2 shows a PUCCH spatial relation indication MAC CE according to an embodiment of the disclosure;

FIG. 3 shows an example of a PUCCH spatial relation indication MAC CE according to an embodiment of the disclosure;

FIG. 4 shows an example of a PUCCH spatial relation indication MAC CE according to an embodiment of the disclosure;

FIG. 5 shows an example of a PUCCH spatial relation indication MAC CE according to an embodiment of the disclosure;

FIG. 6 shows an example of PUCCH spatial relation indication MAC CE according to an embodiment of the disclosure;

FIG. 18 is a flowchart illustrating a method performed by a wireless device in accordance with some embodiments; and FIG. 19 illustrates a schematic block diagram of an apparatus in a wireless network in accordance with some embodiments.

DETAILED DESCRIPTION

Figure 1:
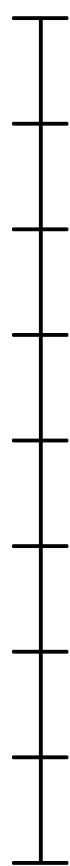
FIG. 1 shows a Physical Uplink Control Channel (PUCCH) spatial relation Activation/Deactivation Medium Access Control (MAC) Control Element (CE)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

PUCCH Spatial Relation Indication MAC CE (Alt. 1)

The first alternative is for enabling spatial relation indication per set of PUCCH resources and/or for a list of PUCCH resources that may or may not belong to one of the sets.

FIG. 2 shows a PUCCH spatial relation indication MAC CE according to the first alternative (alt. 1).

This MAC CE is of flexible size and has the following fields:
E: The value "0" indicates that the MAC CE provides spatial relation info for one or more individual PUCCH resource and that no spatial resources for PUCCH resource sets are provided, i.e. that the octet following this octet is the one containing the F field and PUCCH-Resource ID field. The value "1" indicates that the MAC CE provides spatial resources for up to 4 PUCCH resource sets the UE may be configured with and that no spatial relation info for one or more individual PUCCH resource are provided, i.e. that the octet following this octet is the one containing the PUCCH-SpatialRelationInfo set1 field. The length of the field is 1 bit;

ServCellIndex: This field indicates the servCellIndex of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the field is 2 bits;

PUCCH SpatialRelationInfo seti: This field contains an identifier of the PUCCH spatial relation info identified by PUCCH-SpatialRelationInfoId indicated for a PUCCH resource set i as specified in TS 38.331 [5]. If UE is not configured with set i, the UE shall ignore the corresponding PUCCH SpatialRelationInfo seti field. The length of the field is 6 bits;

F: This field indicates whether an additional octet with F field and PUCCH-Resource ID with the same corresponding spatial relation info as the PUCCH-Resource ID in this octet follows this octet. The value "0" indicates that one additional octet containing the F field and PUCCH-Resource ID follows this octet. The value "1" indicates that the following octet contains the M field and the PUCCH-SpatialRelationInfo res field follows this octet. The length of this field is 1 bit;

PUCCH Resource ID: This field contains an identifier of the PUCCH resource ID identified by PUCCH-ResourceId as specified in TS 38.331 [5]. The length of this field is 7 bits;

M: This field indicates whether an additional octet with F field and PUCCH-Resource ID follows or if there are no additional octets. The value "0" indicates that an additional octet with F field and PUCCH-Resource ID follows. The value "1" indicates that no additional octets follow. The length of this field is 1 bit;

PUCCH SpatialRelationInfo res: This field contains an identifier of the PUCCH spatial relation info identified by PUCCH-SpatialRelationInfoId indicated for a PUCCH resource as specified in TS 38.331 [5]. The length of this field is 6 bits;

R: Reserved bit, set to 0.

Use Cases of this MAC CE:

1. In the beginning of operation, giving spatial relation info per PUCCH resource set is efficient to give the UE a starting point for all configured PUCCH resources without the need for spatial relation MAC CE indications for individual PUCCH resources. In the beginning, network does not typically know more specific spatial relation info and could give for example the SSB the UE used last time for random access as a spatial relation source.

2. Later, the same MAC CE can be used to give spatial relation info for individual resources, or for a list of individual resources.

PUCCH Spatial Relation Indication MAC CE (Alt. 2)

The second alternative is for enabling spatial relation indication per set of PUCCH resources and/or for one or more groups of PUCCH resources that may or may not belong to one of the sets. The number of PUCCH resources per each of the groups is dynamically indicated within the MAC CE.

The design of the MAC CE is shown in FIG. 3, which shows an example of PUCCH spatial relation indication MAC CE (alt. 2).

This MAC CE is of flexible size and has the following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

PUCCH Resource ID: This field contains an identifier of the PUCCH resource ID identified by PUCCH-ResourceId as specified in TS 38.331 [5]. The length of the field is 7 bits;

PUCCH SpatialRelationInfo for a set: This field contains an identifier of the PUCCH spatial relation info identified by PUCCH-SpatialRelationInfoId indicated for a PUCCH resource Set as specified in TS 38.331 [5]. The length of the field is 6 bits;

PUCCH SpatialRelationInfo for a group of resources: This field contains an identifier of the PUCCH spatial relation info identified by PUCCH-SpatialRelationInfoId indicated for a group of PUCCH resources as specified in TS 38.331 [5]. The group of PUCCH resource for which the PUCCH-SpatialRelationInfoId indicated is given in preceding octets as determined by the F field. The length of the field is 6 bits; Note that the size of the group can be 1 PUCCH resource.

E: The value "0" indicates that the MAC CE instead gives spatial relation info for one or more individual PUCCH resources. The value "1" indicates the presence of three octets giving spatial relation info's for up to 4 PUCCH resource sets the UE may be configured with. "sett" refers to a first RRC configured PUCCH resource set, "set2" refers to a second RRC configured PUCCH resource set and so on. If UE is configured with less than 4 sets, the rest of these bits are set to 0.

F: This field indicates whether or not there is an additional PUCCH resource in a PUCCH group. The value '1' indicates there is an additional PUCCH resource in the PUCCH group whose PUCCH Resource ID is given in the next Octet. The value '0' indicates the PUCCH resource whose ID is given in the current octet is the last in the PUCCH group. The PUCCH group consists of N PUCCH resources which are given as (N−1) PUCCH resources with PUCCH Resource IDs corresponding to F=1 in consecutive octets and an additional PUCCH resource whose PUCCH Resource ID is given in the following Octet with F=0.

M: This field indicates whether there is an additional PUCCH resource group whose spatial relation info is to be updated. The value '1' indicates there is a spatial relation update for an additional PUCCH resource group whose PUCCH Resource IDs will be given in the following Octets. The value '0' indicates this is the last PUCCH resource group for which spatial relation update is provided.

R: Reserved bit, set to 0.

In the example in FIG. x2, there are 3 PUCCH resource groups with the first PUCCH resource group consisting of 4 PUCCH resources, the second PUCCH resource group consisting of 2 PUCCH resources, and the last PUCCH resource group consisting of 1 PUCCH resource.

Use cases of this MAC CE:

3. In the beginning of operation, giving spatial relation info per PUCCH resource set is efficient to give the UE a starting point for all configured PUCCH resources without the need for spatial relation MAC CE indications for individual PUCCH resources. In the beginning, network does not typically know more specific spatial relation info and could give for example the SSB the UE used last time for random access as a spatial relation source.

4. Later, the same MAC CE can be used to give spatial relation info for one or more groups of PUCCH resources. The PUCCH resource groups can have different number of PUCCH resources per group. This is beneficial as the size of the PUCCH resource group can be dynamically changed with each PUCCH resource group is used to target transmission in a different transmission direction (i.e., via different spatial relation info). For instance, the UE could be configured to transmit PUCCH towards multiple transmission nodes with different directions where PUCCH resources used to transmit in the same direction (via same PUCCH spatial relation info) are grouped into one PUCCH group. Depending on the amount of uplink control information (UCI) to be transmitted to each node, the UE may need to use different number of PUCCH resources per different PUCCH groups.

PUCCH Spatial Relation Indication MAC CE (Alt. 3)

The third alternative is for enabling spatial relation indication per set of PUCCH resources and/or for one or more groups of PUCCH resources that may or may not belong to one of the sets. The number of PUCCH resources per each of the groups is predefined using RRC.

The design of the MAC CE is shown in FIG. 4, which shows an example of PUCCH spatial relation indication MAC CE (alt. 3).

This MAC CE is of flexible size and has the following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

PUCCH Resource ID: This field contains an identifier of the PUCCH resource ID identified by PUCCH-ResourceId as specified in TS 38.331 [5]. The length of the field is 7 bits;

PUCCH Group ID: This field contains an identifier of the PUCCH resource group ID identified by a higher layer parameter which is configured per PUCCH resource. The length of the field is 2 bits;

PUCCH SpatialRelationInfo for a set: This field contains an identifier of the PUCCH spatial relation info identified by PUCCH-SpatialRelationInfoId indicated for a PUCCH resource Set as specified in TS 38.331 [5]. The length of the field is 6 bits;

PUCCH SpatialRelationInfo for a group of resources: This field contains an identifier of the PUCCH spatial relation info identified by PUCCH-SpatialRelationInfold indicated for a group of PUCCH resources as specified in TS 38.331 [5]. The group of PUCCH resource for which the PUCCH-SpatialRelationInfold indicated is given in the same octet as given by the PUCCH Group ID field. The group of PUCCH resources are the PUCCH resources that have the same PUCCH group ID. The length of the field is 6 bits;

In the example in FIG. x3, there are 2 PUCCH resource groups for which spatial relation info is updated.

Use cases of this MAC CE:

5. In the beginning of operation, giving spatial relation info per PUCCH resource set is efficient to give the UE a starting point for all configured PUCCH resources without the need for spatial relation MAC CE indications for individual PUCCH resources. In the beginning, network does not typically know more specific spatial relation info and could give for example the SSB the UE used last time for random access as a spatial relation source.

6. Later, the same MAC CE can be used to give spatial relation info for one or more groups of PUCCH resources. The PUCCH resource groups in this alternative are predefined.

PUCCH Spatial Relation Indication MAC CE (Alt. 4)

The fourth alternative is for enabling spatial relation indication per serving cell or BWP. This MAC CE has many variants depending on how exactly the fields are set. The principle here is that the MAC CE gives one or more serving cell IDs and either common or individual spatial relation infos which apply to all PUCCH resources RRC configured for that serving cell. Optionally, the MAC CE may include spatial relation infos for each or some of the BWPs belonging to one of the indicated serving cells. A C field is used to indicate the exact structure for the fields of the MAC CE. As can be seen, there is a lot of flexibility how the details of the MAC CE can be set. Some examples are provided here:

The design of the MAC CE for alt. 4 is shown in FIG. 5, which shows an example of PUCCH spatial relation indication MAC CE (alt. 4).

This MAC CE is of flexible size and has the following fields:

Serving Cell ID: This field indicates the identity of the Serving Cell for which the MAC CE applies. The length of the field is 5 bits;

PUCCH SpatialRelationInfo BWP1: This field contains an identifier of the PUCCH spatial relation info identified by PUCCH-SpatialRelationInfoId indicated for a PUCCH resources configured for a BWPi as specified in TS 38.331 [5]. If UE is not configured with BWP i, the UE shall ignore the corresponding PUCCH SpatialRelationInfo BWPi field. The length of the field is 6 bits;

C: This field describes if the block of octets for spatial relation info BWP is present, and if is followed by another serving cell ID with potential block of BWPs. Value 00 means only serving cell ID is present and only first spatial relation BWP which is then applied to all configured BWPs of the cell. Value 10 means one serving cell and all spatial relation BWPs are indicated but this block is not followed by next serving cell ID. Value 01 means the serving cell indicated in the same octet will follow one spatial relation per BWP which is applied to all BWPs of that cell and that the block is followed by octet with C field and serving cell ID. Value 11 means the serving cell indicated in the same octet will follow with a block of all spatial relation BWPs are indicated of that cell and that the block is followed by octet with C field and serving cell ID.

The design of the MAC CE is shown in FIG. 6, which shows a further example of PUCCH spatial relation indication MAC CE according to alt. 4.

This MAC CE is of flexible size and has the following fields:

Serving Cell ID: This field indicates the identity of the Serving Cell for which the MAC CE applies. The length of the field is 5 bits;

PUCCH SpatialRelationInfo BWP1: This field contains an identifier of the PUCCH spatial relation info identified by PUCCH-SpatialRelationInfoId indicated for a PUCCH resources configured for a BWPi as specified in TS 38.331 [5]. If UE is not configured with BWP i, the UE shall ignore the corresponding PUCCH SpatialRelationInfo BWPi field. The length of the field is 6 bits;

C: This field describes the total format of the MAC CE. Size of this field is 3 bits. It has 8 states and each state can be specified to correspond a specific format instructing for example the total number of cell IDs and corresponding spatial relation infos for all PUCCH resources. Or, some combination of serving cells and BWPs It should be noted that any of the MAC CEs described herein can be formed without E fields and to only contain blocks related to the PUCCH resource sets or to PUCCH resources. The E field can also have the following interpretation: E is set to 0, the MAC CE contains only PUCCH resource set related octets, or E is set to 1 and the MAC CE contains both PUCCH resource set related octets and PUCCH resource related octets. In this case, the spatial relation info given for a PUCCH resource directly overrides a possible spatial resource given in the PUCCH resource set related octets.

Further, the blocks formed by octets with a specific functionality, e.g. PUCCH resource and corresponding spatial relations, are described for one MAC CE but may be combined in other MAC CEs as these blocks provide functionalities that can be used in other contexts than only the MAC CE described herein.

In this disclosure several fields with codepoints/values and their corresponding meaning are described, i.e. the mapping from codepoints/values of the fields to a meaning. Examples of these fields are E fields, F fields, and S fields. It should be noted that a mapping may use any codepoints/values and the codepoints/values in the description are to be considered as examples.

In each of the alternative embodiments set out above, when the UE receives the MAC CE it sets the spatial relation assumption for the indicated PUCCH resources as commanded in the MAC CE. When the UE sends PUCCH subsequently, the UE applies the spatial relation indicated when selecting transmit precoding weights.

Figure 7:
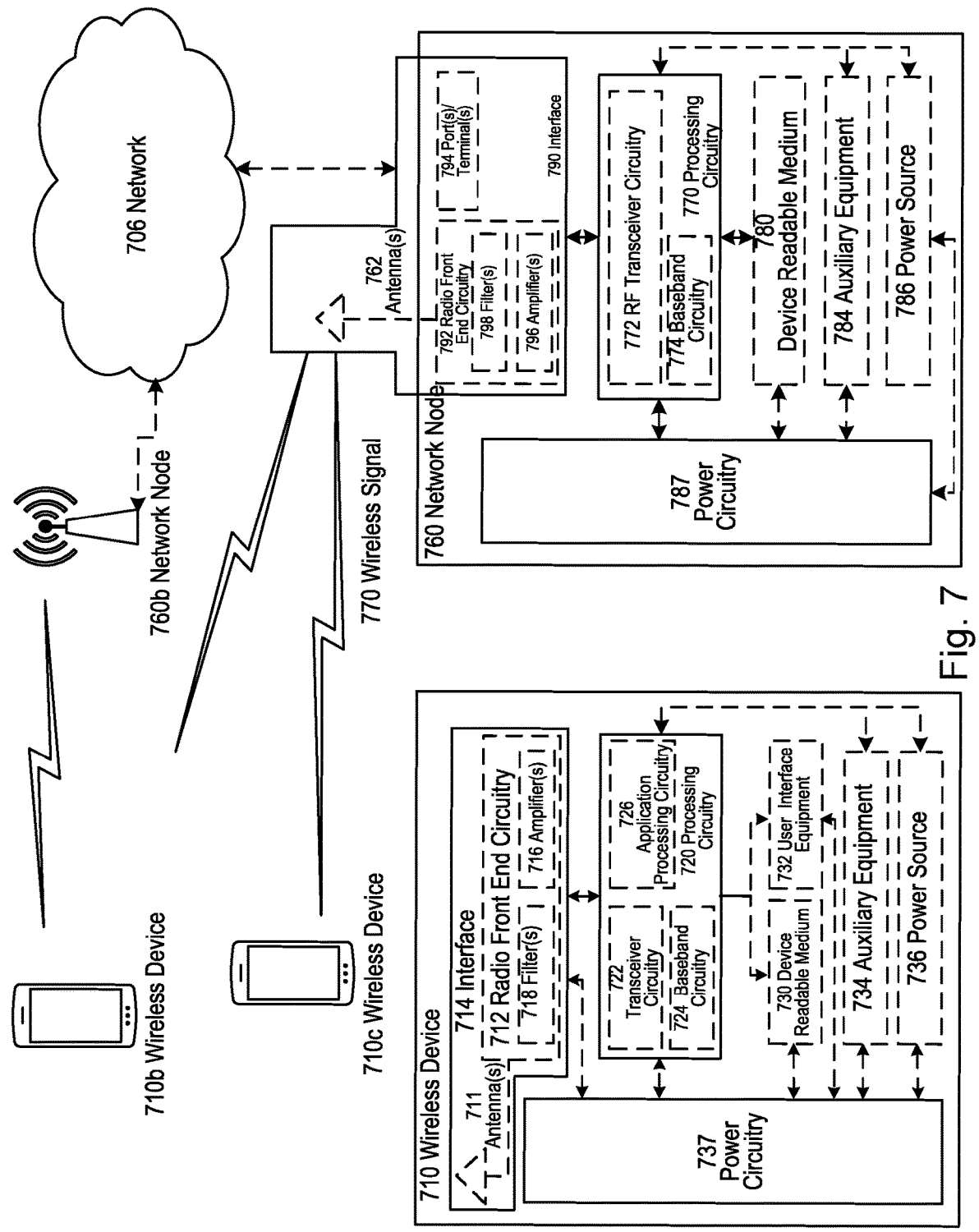
FIG. 7 shows a wireless network in accordance with some embodiments.

FIG. 7 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5th Generation (5G) standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers, MSCs, Mobility Management Entity, MMEs), Operation and Maintenance (O&M) nodes, Operations Support System (OSS) nodes, SON nodes, positioning nodes (e.g., Evolved-Serving Mobile Location Centres, E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M)

device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
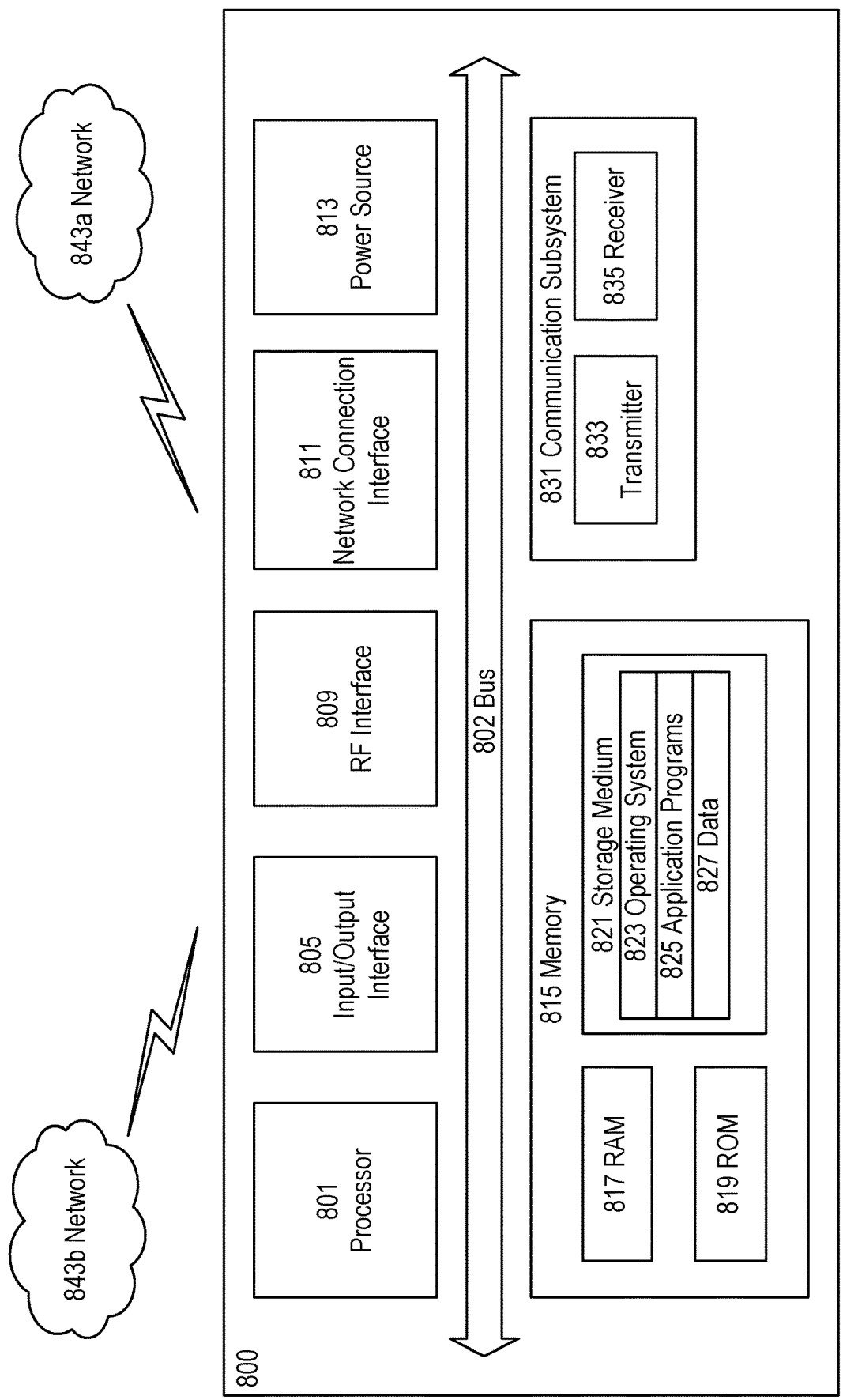
FIG. 8 shows a User Equipment in accordance with some embodiments.

FIG. 8 shows a User Equipment (UE) in accordance with some embodiments. FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
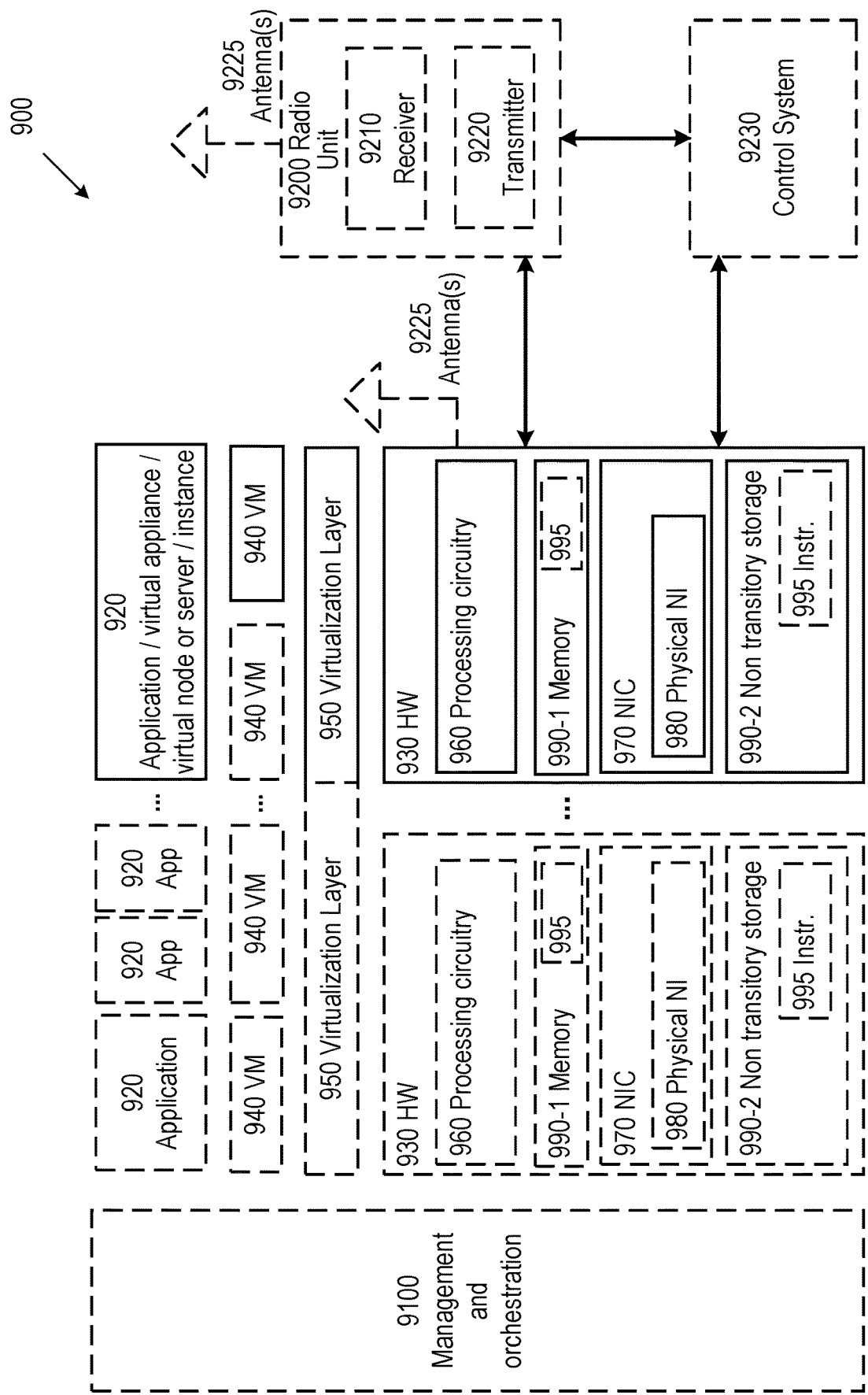
FIG. 9 shows a schematic block diagram illustrating a virtualization environment in accordance with some embodiments.

FIG. 9 shows a virtualization environment in accordance with some embodiments. FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
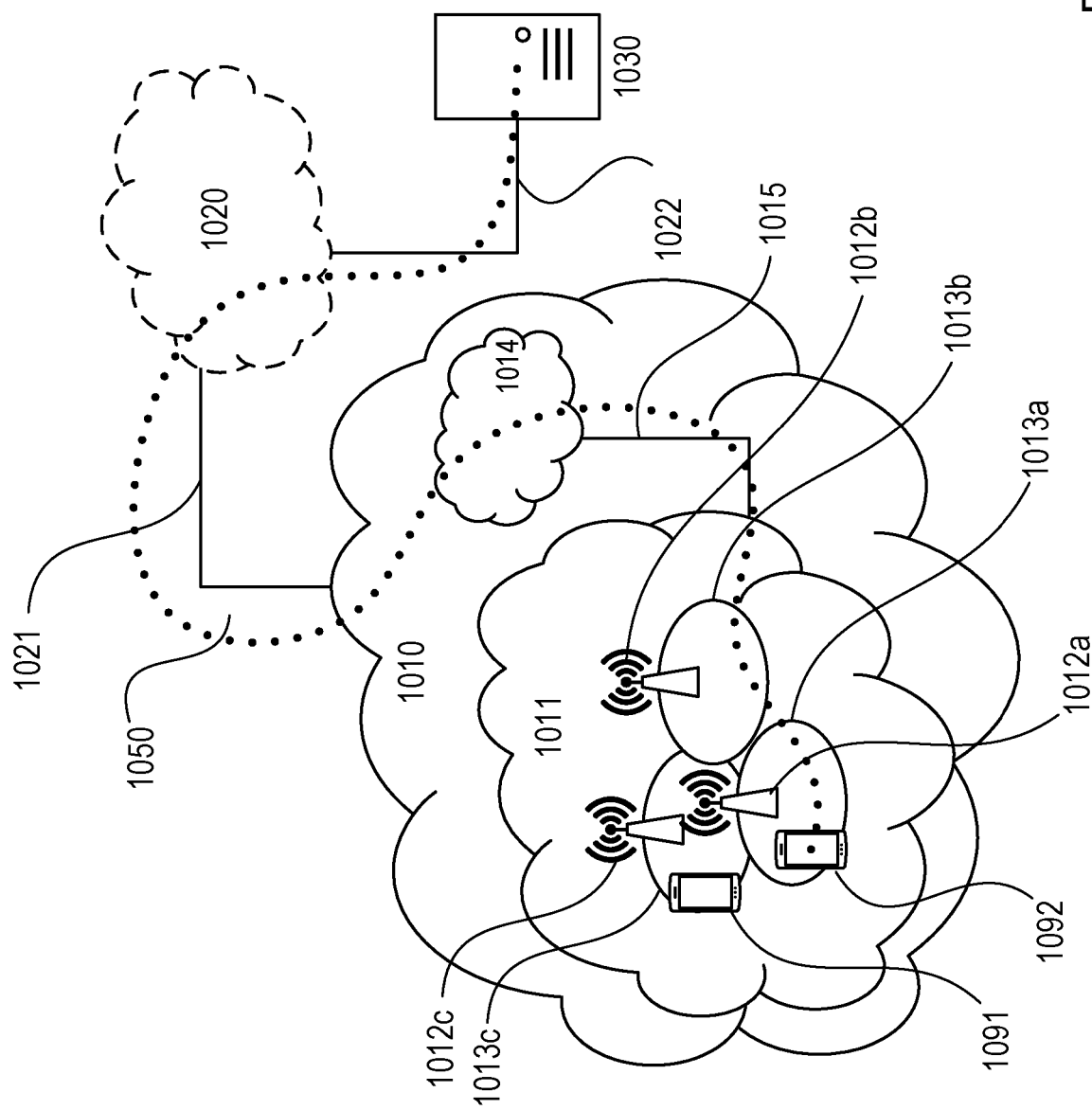
FIG. 10 shows a telecommunication network connected via an intermediate network to a host computer in accordance with some embodiments.

FIG. 10 shows a telecommunication network connected via an intermediate network to a host computer in accordance with some embodiments. With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network

1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
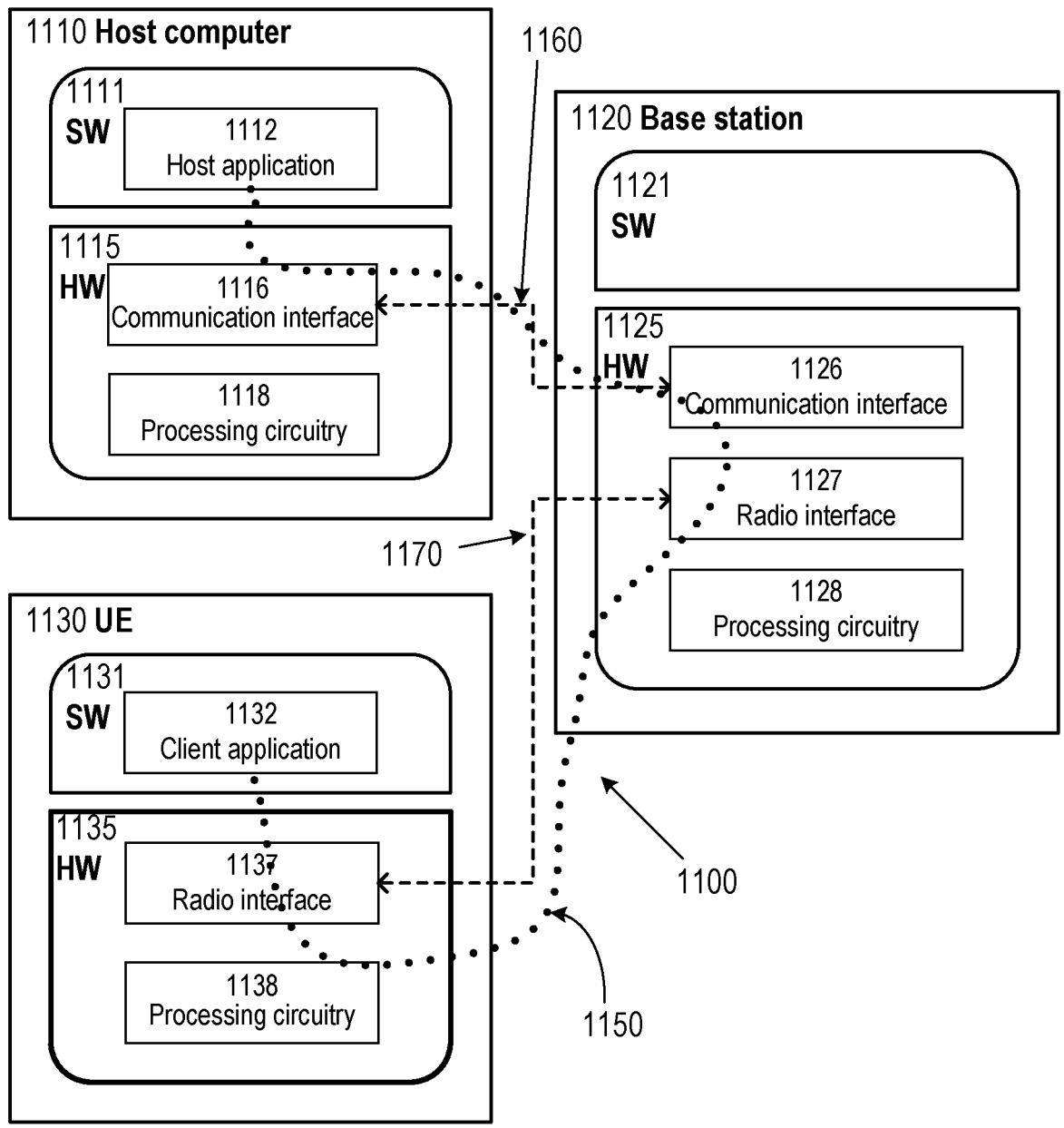
FIG. 11 shows a host computer communicating via a base station with a user equipment over a partially wireless connection in accordance with some embodiments.

FIG. 11 shows a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the data rate, latency, and power consumption and thereby provide benefits such as reduced user waiting time, relaxed restriction on file size, better responsiveness, and extended battery lifetime. A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
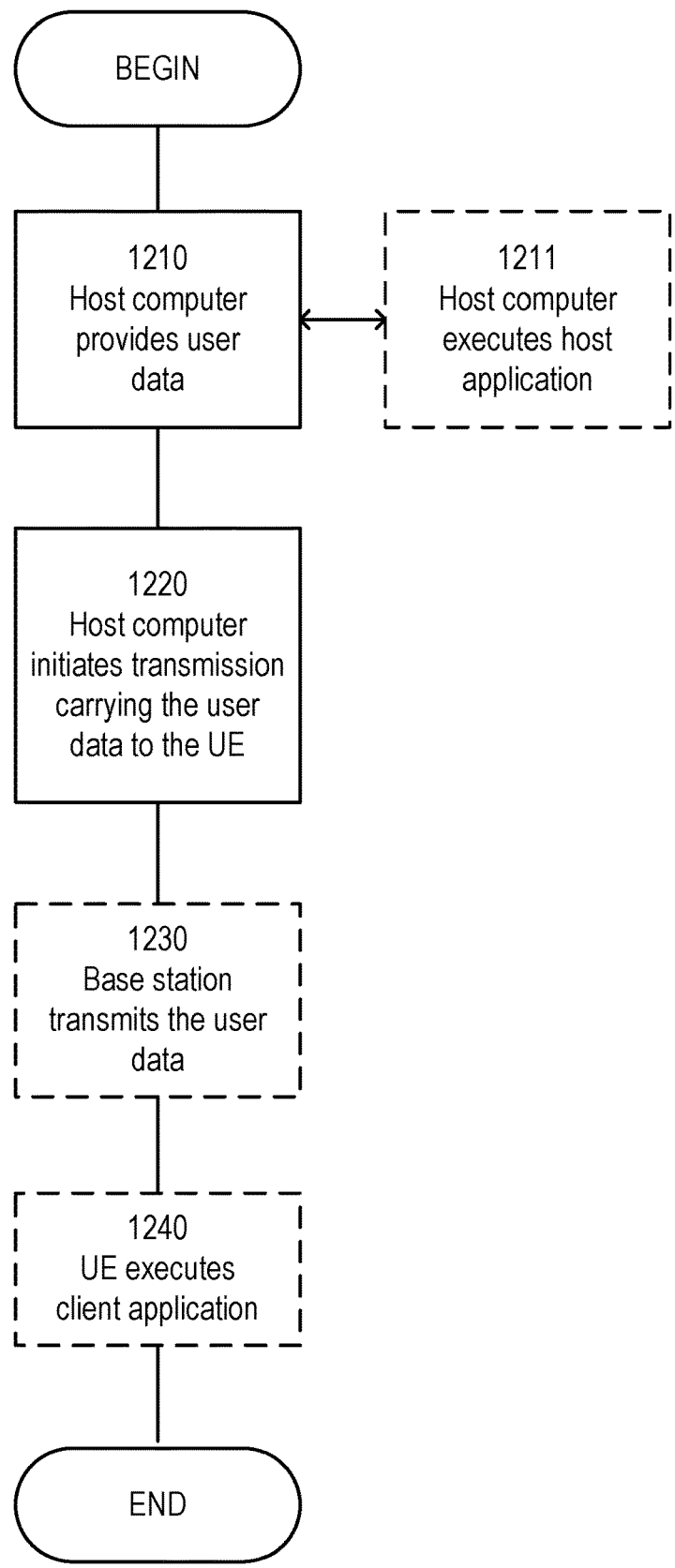
FIG. 12 is a flowchart illustrating a method implemented in a communication system, in accordance with an embodiment.

FIG. 12 shows methods implemented in a communication system including a host computer, a base station and a user equipment in accordance with some embodiments. FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
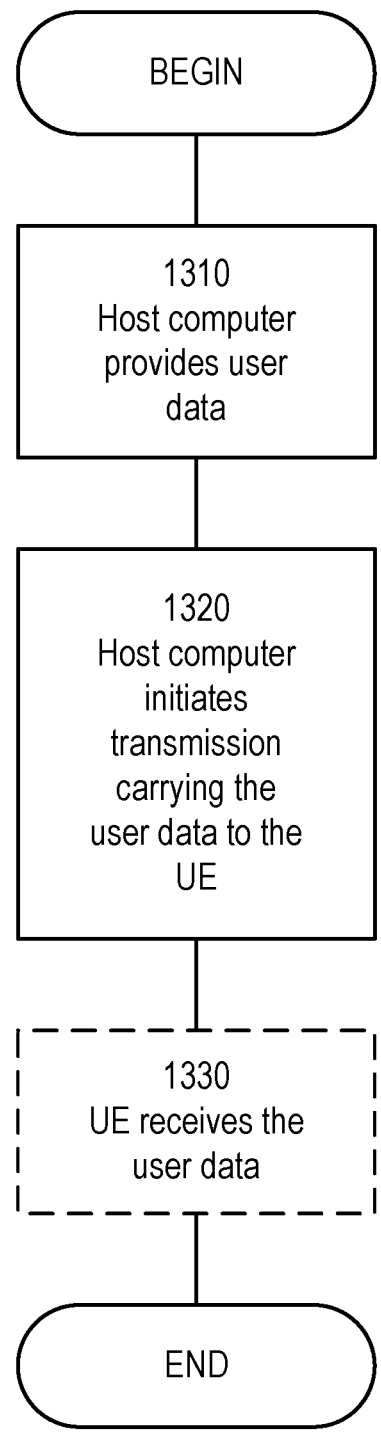
FIG. 13 is a flowchart illustrating a method implemented in a communication system, in accordance with an embodiment.

FIG. 13 shows methods implemented in a communication system including a host computer, a base station and a user equipment in accordance with some embodiments. FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
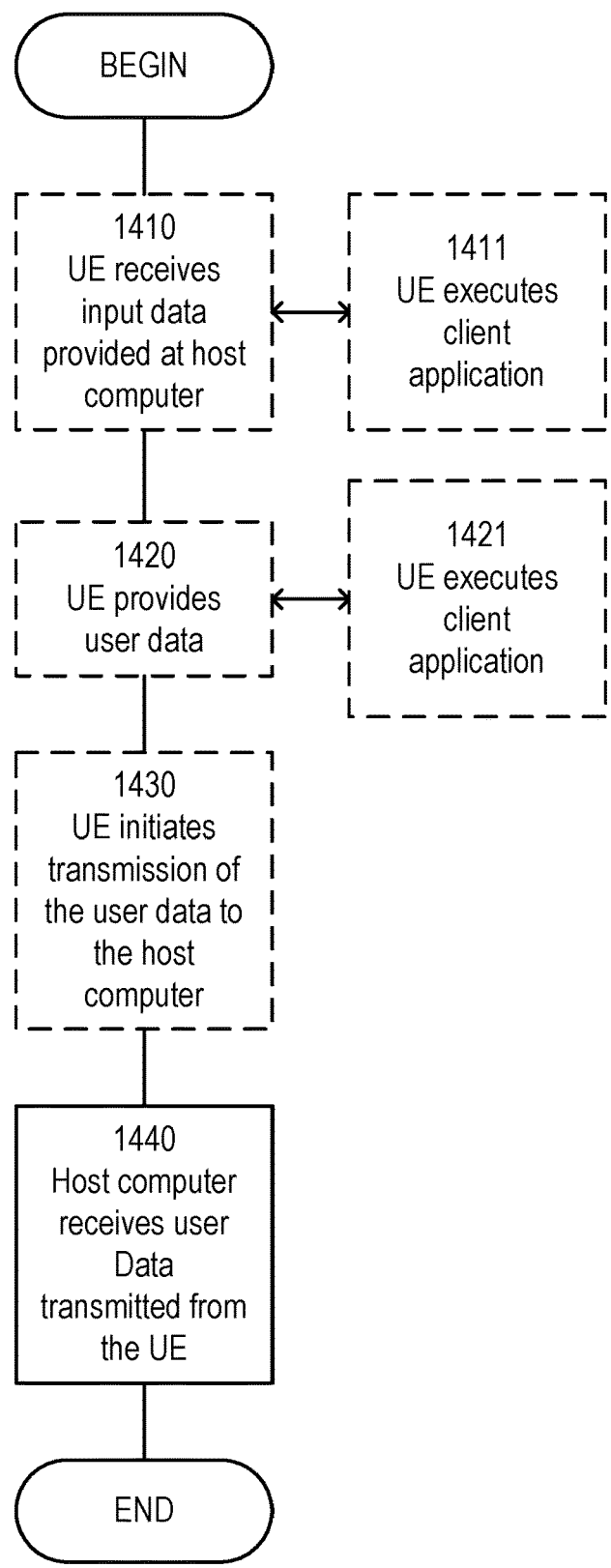
FIG. 14 is a flowchart illustrating a method implemented in a communication system, in accordance with an embodiment.

FIG. 14 shows methods implemented in a communication system including a host computer, a base station and a user equipment in accordance with some embodiments. FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
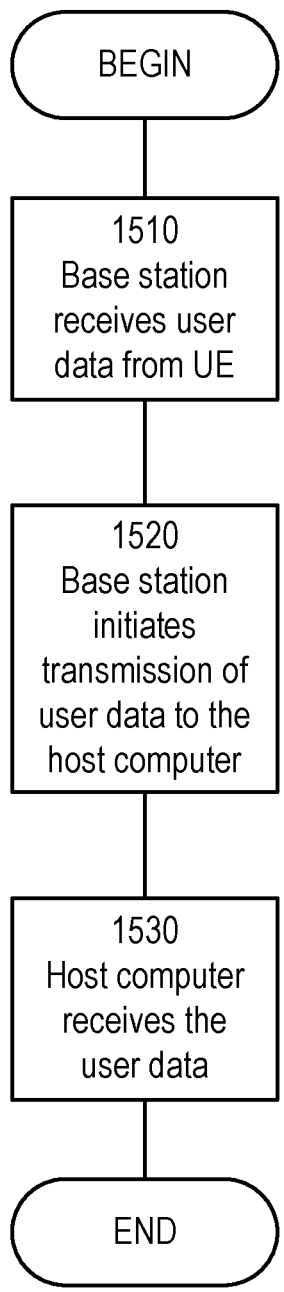
FIG. 15 is a flowchart illustrating a method implemented in a communication system, in accordance with an embodiment.

FIG. 15 shows methods implemented in a communication system including a host computer, a base station and a user equipment in accordance with some embodiments. FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
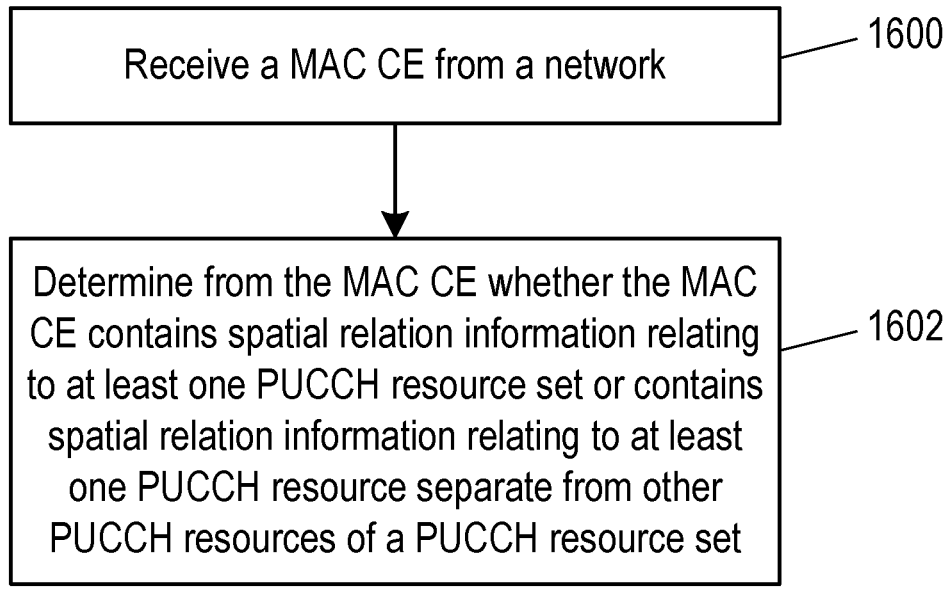
FIG. 16 is a flowchart illustrating a method performed by a wireless device in accordance with some embodiments.

FIG. 16 shows a method in accordance with some embodiments. FIG. 16 depicts a method performed by a wireless device for obtaining information about Physical Uplink Control Channel, PUCCH, resources, in accordance with particular embodiments. The method begins at step 1600 with receiving a Medium Access Control, MAC, Control Element, CE from a network. The method further comprises step 1602, namely determining from the MAC CE whether the MAC CE contains spatial relation information relating to at least one PUCCH resource set or contains spatial relation information relating to at least one PUCCH resource separate from other PUCCH resources of a PUCCH resource set. Those skilled in the art will appreciate that the MAC CE may correspond to any of those described above with respect to FIGS. 3 to 6.

Figure 17:
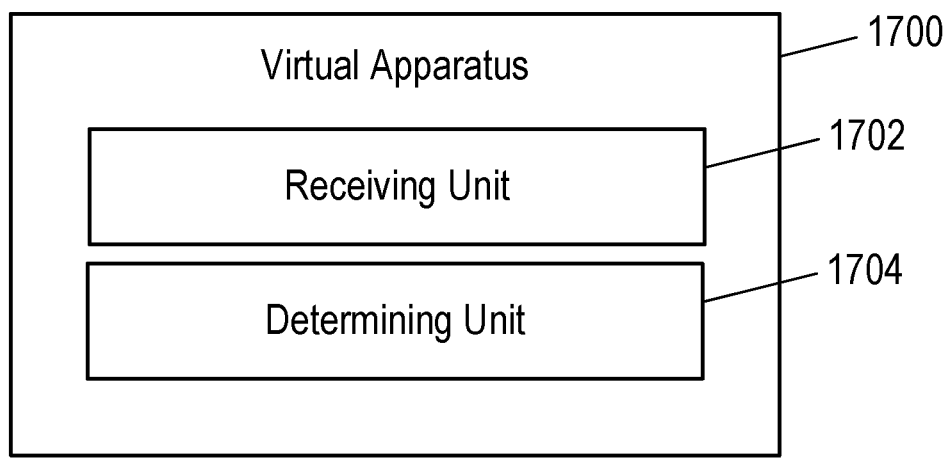
FIG. 17 illustrates a schematic block diagram of an apparatus in a wireless network in accordance with some embodiments.

FIG. 17 shows a virtualization apparatus in accordance with some embodiments. FIG. 17 illustrates a schematic block diagram of an apparatus 1700 in a wireless network (for example, the wireless network shown in FIG. 7). The apparatus may be implemented in a wireless device or network node (e.g., wireless device 710 or network node 760 shown in FIG. 7). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, and any other suitable units of apparatus 1700 to perform corresponding functions according one or more embodiments of the present disclosure.

As illustrated in FIG. 17, apparatus 1700 includes a receiver unit 1702, configured to receive a Medium Access Control, MAC, Control Element, CE from a network, and a determining unit 1704, configured to determine from the MAC CE whether the MAC CE contains spatial relation information relating to at least one PUCCH resource set or contains spatial relation information relating to at least one PUCCH resource separate from other PUCCH resources of a PUCCH resource set.

FIG. 18 shows a method in accordance with some embodiments. FIG. 18 depicts a method performed by a wireless device for obtaining information about Physical Uplink Control Channel, PUCCH, resources, in accordance with particular embodiments. The method comprises step 1800 of receiving a Medium Access Control, MAC, Control Element, CE from a network, wherein the MAC CE contains respective spatial relation information relating to PUCCH resources configured for at least one specific bandwidth part. Those skilled in the art will appreciate that the MAC CE may correspond to any of those described above with respect to FIGS. 3 to 6.

FIG. 19 shows a virtualization apparatus in accordance with some embodiments. FIG. 19 illustrates a schematic block diagram of an apparatus 1900 in a wireless network (for example, the wireless network shown in FIG. 7). The apparatus may be implemented in a wireless device or network node (e.g., wireless device 710 or network node 760 shown in FIG. 7). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1902, and any other suitable units of apparatus 1900 to perform corresponding functions according one or more embodiments of the present disclosure.

As illustrated in FIG. 19, apparatus 1900 includes receiver unit 1902, which is configured to receive a Medium Access Control, MAC, Control Element, CE from a network, wherein the MAC CE contains respective spatial relation information relating to PUCCH resources configured for at least one specific bandwidth part.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure.

Group A Embodiments

1. A method performed by a wireless device for obtaining information about Physical Uplink Control Channel, PUCCH, resources, the method comprising:
   receiving a Medium Access Control, MAC, Control Element, CE from a network, and
   determining from the MAC CE whether the MAC CE contains spatial relation information relating to at least one PUCCH resource set or contains spatial relation information relating to at least one PUCCH resource separate from other PUCCH resources of a PUCCH resource set.
2. A method according to embodiment 1, wherein the at least one PUCCH resource set is a predefined set of PUCCH resources.
3. A method according to embodiment 1 or 2, wherein the spatial relation information relating to at least one PUCCH resource separate from other PUCCH resources of a PUCCH resource set comprises common spatial relation information relating to at least one group of PUCCH resources.
4. A method according to embodiment 3, wherein the MAC CE contains respective identifiers for the PUCCH resources in the or each group of PUCCH resources.
5. A method according to embodiment 3, wherein the or each group of PUCCH resources is predefined, and wherein the MAC CE contains a respective identifier for the or each group of PUCCH resources.
6. A method performed by a wireless device for obtaining information about Physical Uplink Control Channel, PUCCH, resources, the method comprising:
   receiving a Medium Access Control, MAC, Control Element, CE from a network, wherein the MAC CE contains respective spatial relation information relating to PUCCH resources configured for at least one specific bandwidth part.
7. A method according to embodiment 6, wherein the MAC CE contains respective spatial relation information relating to PUCCH resources configured for at least one specific bandwidth part for a specified serving cell.
8. A method according to embodiment 7, comprising obtaining from the MAC CE respective spatial relation information relating to PUCCH resources configured for at least one specific bandwidth part for each of a plurality of specified serving cells.
9. The method of any preceding embodiment, comprising:
   setting a spatial relation assumption for the resources of at least one PUCCH resource based on the received spatial relation information.
10. The method of any preceding embodiment, comprising:
    transmitting a signal on the PUCCH using the received spatial relation information.
11. The method of embodiment 10, comprising:
    applying a spatial relation indicated by the received spatial relation information when selecting transmit precoding weights.
12. The method of any of the previous embodiments, further comprising:
    providing user data; and
    forwarding the user data to a host computer via the transmission to the base station.

Group B Embodiments

13. A method performed by a base station for providing information about Physical Uplink Control Channel, PUCCH, resources, the method comprising:
    transmitting a Medium Access Control, MAC, Control Element, CE to a wireless device, and
    indicating in the MAC CE whether the MAC CE contains spatial relation information relating to at least one PUCCH resource set or contains spatial relation information relating to at least one PUCCH resource separate from other PUCCH resources of a PUCCH resource set.
14. A method according to embodiment 13, wherein the at least one PUCCH resource set is a predefined set of PUCCH resources.
15. A method according to embodiment 13 or 14, wherein the spatial relation information relating to at least one PUCCH resource separate from other PUCCH resources of a PUCCH resource set comprises common spatial relation information relating to at least one group of PUCCH resources.
16. A method according to embodiment 15, wherein the MAC CE contains respective identifiers for the PUCCH resources in the or each group of PUCCH resources.
17. A method according to embodiment 15, wherein the or each group of PUCCH resources is predefined, and wherein the MAC CE contains a respective identifier for the or each group of PUCCH resources.
18. A method performed by a base station for providing information about Physical Uplink Control Channel, PUCCH, resources, the method comprising:
    transmitting a Medium Access Control, MAC, Control Element, CE to a wireless device, wherein the MAC CE contains respective spatial relation information relating to PUCCH resources configured for at least one specific bandwidth part.
19. A method according to embodiment 18, wherein the MAC CE contains respective spatial relation information relating to PUCCH resources configured for at least one specific bandwidth part for a specified serving cell.
20. A method according to embodiment 19, comprising configuring the MAC CE to contain respective spatial relation information relating to PUCCH resources configured for at least one specific bandwidth part for each of a plurality of specified serving cells.
21. The method of any of the previous embodiments, further comprising:
    obtaining user data; and
    forwarding the user data to a host computer or a wireless device.

Group C Embodiments

22. A wireless device, the wireless device comprising:
    processing circuitry configured to perform any of the steps of any of the Group A embodiments; and
    power supply circuitry configured to supply power to the wireless device.
23. A base station, the base station comprising:
    processing circuitry configured to perform any of the steps of any of the Group B embodiments;
    power supply circuitry configured to supply power to the base station.

24. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

25. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

26. The communication system of the previous embodiment further including the base station.

27. The communication system of the previous 2 embodiments, further including the UE, wherein the UE is configured to communicate with the base station.

28. The communication system of the previous 3 embodiments, wherein:
the processing circuitry of the host computer is configured to execute a host application, thereby providing the user data; and
the UE comprises processing circuitry configured to execute a client application associated with the host application.

29. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

30. The method of the previous embodiment, further comprising, at the base station, transmitting the user data.

31. The method of the previous 2 embodiments, wherein the user data is provided at the host computer by executing a host application, the method further comprising, at the UE, executing a client application associated with the host application.

32. A user equipment (UE) configured to communicate with a base station, the UE comprising a radio interface and processing circuitry configured to performs the of the previous 3 embodiments.

33. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

34. The communication system of the previous embodiment, wherein the cellular network further includes a base station configured to communicate with the UE.

35. The communication system of the previous 2 embodiments, wherein:
the processing circuitry of the host computer is configured to execute a host application, thereby providing the user data; and
the UE's processing circuitry is configured to execute a client application associated with the host application.

36. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

37. The method of the previous embodiment, further comprising at the UE, receiving the user data from the base station.

38. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

39. The communication system of the previous embodiment, further including the UE.

40. The communication system of the previous 2 embodiments, further including the base station, wherein the base station comprises a radio interface configured to communicate with the UE and a communication interface configured to forward to the host computer the user data carried by a transmission from the UE to the base station.

41. The communication system of the previous 3 embodiments, wherein:
the processing circuitry of the host computer is configured to execute a host application; and
the UE's processing circuitry is configured to execute a client application associated with the host application, thereby providing the user data.

42. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

43. A method implemented in a communication system including a host computer, a base station and a user equipment (UE), the method comprising:
at the host computer, receiving user data transmitted to the base station from the UE, wherein the UE performs any of the steps of any of the Group A embodiments.

44. The method of the previous embodiment, further comprising, at the UE, providing the user data to the base station.

45. The method of the previous 2 embodiments, further comprising:
at the UE, executing a client application, thereby providing the user data to be transmitted; and
at the host computer, executing a host application associated with the client application.

46. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

47. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

48. The communication system of the previous embodiment further including the base station.

49. The communication system of the previous 2 embodiments, further including the UE, wherein the UE is configured to communicate with the base station.

50. The communication system of the previous 3 embodiments, wherein:
the processing circuitry of the host computer is configured to execute a host application;
the UE is configured to execute a client application associated with the host application, thereby providing the user data to be received by the host computer.

51. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

52. The method of the previous embodiment, further comprising at the base station, receiving the user data from the UE.

53. The method of the previous 2 embodiments, further comprising at the base station, initiating a transmission of the received user data to the host computer.

The invention claimed is:

1. A method performed by a wireless device for obtaining information about Physical Uplink Control Channel, PUCCH, resources, the method comprising:
receiving a Medium Access Control, MAC, Control Element, CE from a network, the MAC CE containing respective spatial relation information relating to PUCCH resources configured for at least one specific bandwidth part for a specified serving cell; and
obtaining from the MAC CE respective spatial relation information relating to PUCCH resources configured for at least one specific bandwidth part for each of a plurality of specified serving cells.

2. The method according to claim 1, wherein the MAC CE comprises a field indicating the identity of the specified serving cell.

3. The method according to claim 1, wherein the MAC CE contains spatial relation information for each of the bandwidth parts belonging to the specified serving cell.

4. The method according to claim 1, comprising:
setting a spatial relation assumption for the resources of at least one PUCCH resource based on the received spatial relation information.

5. The method according to claim 1, comprising:
transmitting a signal on the PUCCH using the received spatial relation information.

6. The method according to claim 5, comprising:
applying a spatial relation indicated by the received spatial relation information when selecting transmit precoding weights.

7. A method performed by a base station for providing information about Physical Uplink Control Channel, PUCCH, resources, the method comprising:
transmitting a Medium Access Control, MAC, Control Element, CE to a wireless device, the MAC CE containing respective spatial relation information relating to PUCCH resources configured for at least one specific bandwidth part for a specified serving cell; and
configuring the MAC CE to contain respective spatial relation information relating to PUCCH resources configured for at least one specific bandwidth part for each of a plurality of specified serving cells.

8. The method according to claim 7, wherein the MAC CE comprises a field indicating the identity of the specified serving cell.

9. The method according to claim 7, wherein the MAC CE contains spatial relation information for each of the bandwidth parts belonging to the specified serving cell.

10. A base station, the base station comprising:
processing circuitry configured to cause the base station to perform any of the steps of claim 7; and
power supply circuitry configured to supply power to the base station.

11. A wireless device for obtaining information about Physical Uplink Control Channel, PUCCH, resources, the wireless device comprising power supply circuitry configured to supply power to the wireless device and processing circuitry configured to cause the wireless device to:
receive a Medium Access Control, MAC, Control Element, CE from a network, the MAC CE containing respective spatial relation information relating to PUCCH resources configured for at least one specific bandwidth part for a specified serving cell; and
cause the wireless device to obtain from the MAC CE respective spatial relation information relating to PUCCH resources configured for at least one specific bandwidth part for each of a plurality of specified serving cells.

12. The wireless device according to claim 11, wherein the MAC CE comprises a field indicating the identity of the specified serving cell.

13. The wireless device according to claim 11, wherein the MAC CE contains spatial relation information for each of the bandwidth parts belonging to the specified serving cell.

* * * * *